Figure 1:
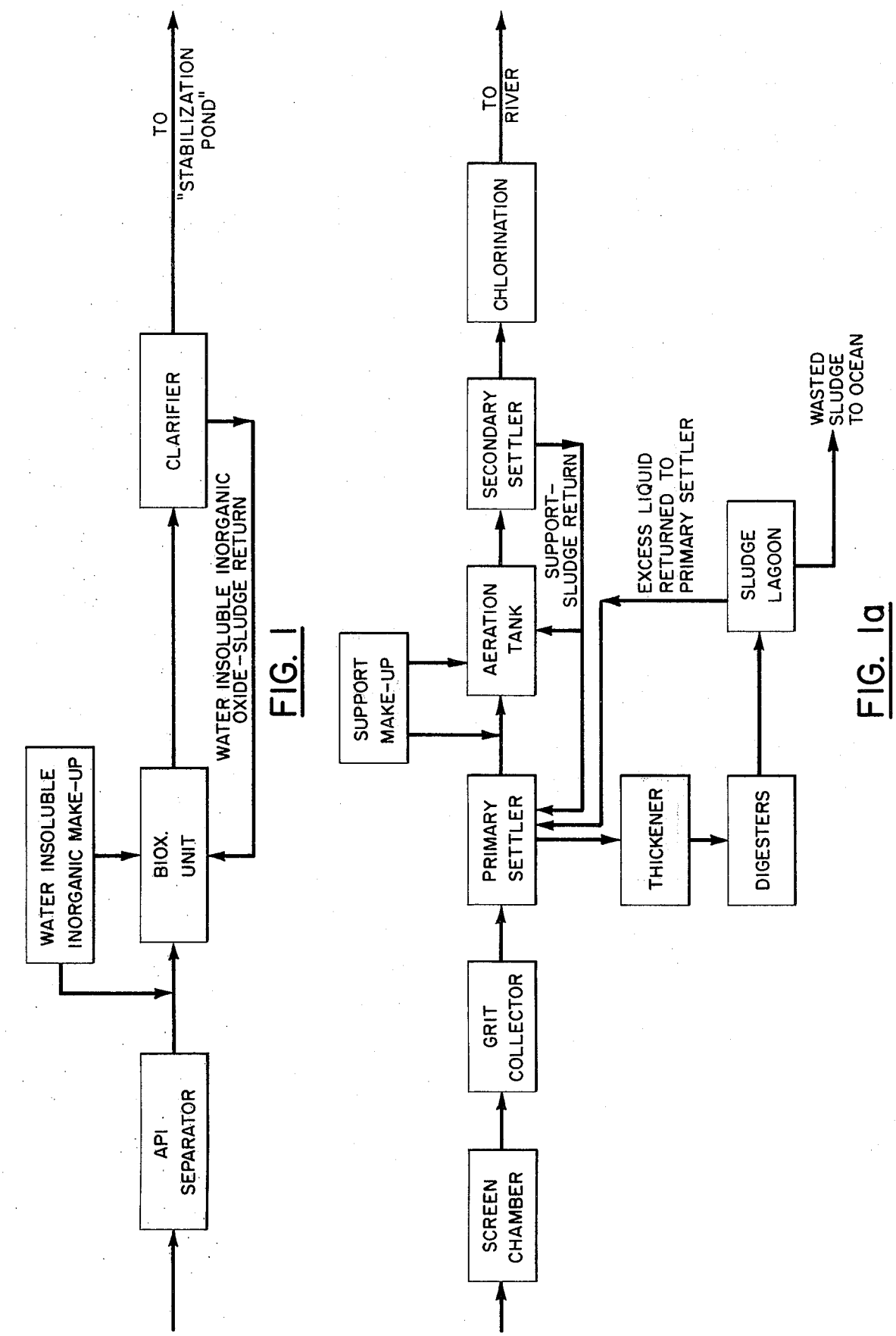

United States Patent [19]
Liles et al.

[11] 3,968,036
[45] July 6, 1976

[54] METHOD OF TREATING WASTE WATER

[75] Inventors: Arthur W. Liles, Murray Hill; Robert D. Schwartz, East Windsor, both of N.J.

[73] Assignee: Exxon Research and Engineering Company, Linden, N.J.

[22] Filed: June 17, 1974

[21] Appl. No.: 480,011

[52] U.S. Cl. .................................. 210/15; 210/18; 210/45
[51] Int. Cl.$^2$ .......................................... C02C 1/20
[58] Field of Search .............................. 210/2–10, 210/15, 18, 63, 42, 45, 47, 50–53; 252/455 Z

[56] References Cited
UNITED STATES PATENTS

| | | | |
|---|---|---|---|
| 1,082,315 | 12/1913 | Gans .................................... | 210/63 |
| 2,029,958 | 2/1936 | Urbain ................................. | 210/63 |
| 2,690,425 | 9/1954 | Moses et al. ......................... | 210/63 |
| 2,944,396 | 7/1960 | Barton et al. ........................ | 210/63 |
| 3,487,016 | 12/1969 | Zeff ..................................... | 210/63 |
| 3,640,820 | 2/1972 | Kemmer et al. ..................... | 210/10 |
| 3,904,518 | 9/1975 | Hutton et al. ....................... | 210/18 |

OTHER PUBLICATIONS

Chen et al. "Feasibility Studies of Applications of Catalytic Oxidation in Wastewater," *Water Pollution Res. Ser.*, EPA., 1971.

*Primary Examiner*—Charles N. Hart
*Assistant Examiner*—Peter A. Hruskoci
*Attorney, Agent, or Firm*—Robert J. Baran; Joseph J. Allocca

[57] ABSTRACT

This invention relates to a novel process for the treatment of waste water from municipal and industrial sources by contacting the waste water with an activated sludge at conditions at which biological oxidation takes place. In this process various water-insoluble inorganic oxides selected from the group consisting of silica, alumina, and silica-alumina are combined with the sludge whereby increased rates of biological oxidation are obtained and the sludge shows increased settleability. In a most preferred embodiment of this method, the water-insoluble inorganic oxide is a spent cracking catalyst, that is, a zeolite which has been used in fluid cracking of hydrocarbon feeds and thus contains vanadium, iron, nickel, copper, and/or carbon. This catalyst may be recovered from aqueous scrubber solutions which are utilized to reduce stack losses in fluidized cracking processes and which, at present, present a solids waste disposal problem.

2 Claims, 5 Drawing Figures

3,968,036

METHOD OF TREATING WASTE WATER

FIELD OF THE INVENTION

This invention relates to a novel process for the treatment of waste water from municipal and industrial sources by contacting the waste water with an activated sludge at conditions at which biological oxidation takes place. In this process various water-insoluble inorganic oxides selected from the group consisting of silica, alumina, and silica-alumina are combined with the sludge whereby increased rates of biological oxidation are obtained and the sludge shows increased settleability. In a most preferred embodiment of this method, the water-insoluble inorganic oxide is a spent cracking catalyst, that is, a zeolite which has been used in fluid cracking of hydrocarbon feeds and thus contains vanadium, iron, nickel, copper, and/or carbon. This catalyst may be recovered from aqueous scrubber solutions which are utilized to reduce stack losses in fluidized cracking processes and which, at present, present a solids waste disposal problem.

BACKGROUND OF THE PRIOR ART

It is known in the art that the addition of various particulates to activated sludges can increase the biological oxidation rate and the settleability of the sludge. In the past, various particulate matter has been added to the sludge, including fly ash, U.S. Pat. No. 3,342,731; powdered coal, U.S. Pat. No. 3,300,403; sludge coke, U.S. Pat. No. 3,275,547; clay, U.S. Pat. No. 2,769,750; silicate gel, U.S.S.R. Pat. No. 255,138; iron floc, U.S. Pat. No. 3,763,038; limestone powder and cement, U.S. Pat. No. 3,226,319. Some of these processes recognize that the particulate matter itself, which is a waste disposal problem, may be conveniently handled in this manner while improving the biological oxidation process rate and the handling of the sludge. However, it is clear that none of these processes recognizes that spent cracking catalyst may be used in a similar manner. In fact, because of the known sensitivity of bacteria, it would be expected that waste materials of this sort, i.e. with high metals content, could not be added to the activated sludge.

SUMMARY OF THE INVENTION

It has now unexpectedly been found that the addition of various water-insoluble inorganic oxides to an activated sludge process will increase the sludge settling rate, compaction, as well as increase the rate at which biologically oxidizable materials are removed. The water-insoluble inorganic oxide is selected from the group consisting of silica, silica-alumina and alumina. A preferred water-insoluble inorganic oxide may be obtained from the scrubbing solutions used to remove particulate matter present in the stack gases from fluidized cracking processes. This preferred particulate matter comprises vanadium, iron, nickel, copper, and carbon supported on a silica-alumina support, especially a zeolite support. It should be noted that the disposal of particulate matter from the stack gases at present presents a solid waste disposal problem which will get worse in the future. Thus, utilizing this particular source of water-insoluble inorganic oxide is extremely beneficial to the petroleum refinery.

Use of the water-insoluble inorganic oxide shows further advantages when combined with an activated sludge process. Along with increased settling rate, the sludge also is decreased in volume. The effluent from the treating step has increased optical clarity and shows a decreased organic carbon content, as compared to using activated sludge alone. When compared to the various other particulates used in prior art sludge processes, the spent catalyst described above provides an effluent having increased optical clarity.

The method of this invention is applicable to the treatment of both industrial and municipal waste water streams. The only requirement in said waste water streams is that there be a source of nutrients for the activated sludge microorganisms.

FIG. 1 describes the use of this invention in the treatment of an industrial waste water stream from a petroleum refinery.

FIG. 1a describes the use of this invention in treating municipal waste water.

In FIG. 1, effluent from a petroleum refinery is brought into an API separator wherein oil is separated from the water. This water is then brought into a Biox unit wherein the activated sludge is contained. In this Biox unit the water-insoluble inorganic oxide may be mixed with the sludge, or the water-insoluble inorganic oxide may be premixed with the water at some point prior to the Biox unit. The waste water may be contacted with the sludge and the water-insoluble inorganic oxide in a batch or continuous manner.

The effluent from the API separator may have a total organic carbon (TOC) greater than 300 ppm. The residence time in the Biox unit may vary from 30 min. to 24 hours, for example 16 hours. The mixture of inorganic oxide, sludge and waste water is pumped from the Biox unit into the clarifier wherein a residence time of 30 min. to 7 hours may be obtained, for example 4.5 hours. The temperatures maintained in the Biox unit and the clarifier may vary from 10°C. to 60°C., for example 25°C. The effluent from the clarifier may show a total organic carbon of 50 or less. The sludge is recycled from the clarifier to the Biox unit. As the process continues, it may become necessary to separate a portion of the sludge at this stage for incineration or other disposable since the sludge volume has a tendency to continuously increase. After incineration the residual ash may be recycled to the Biox unit where it may be used as make-up. This recycled material may be more active than the starting material due to the deposition of metals, oxides, carbon, etc. on its surface.

In the treatment of municipal sewerage described in FIG. 1a, the waste is pumped into a screen chamber followed by a grit collector wherein large bulkier materials are removed. The effluent from the grit collector is pumped into the primary settler wherein the bulk of the suspended particles settle out (as sludge). The residence in the primary settling tank is typically from 45 to 90 minutes. The sludge is removed from the primary settler and sent to a thickener wherein the constituency of the sludge is increased. From the thickener, the sludge is passed to the digester (typically anaerobic) wherein the sludge volume is reduced and pathogenic microorganisms are destroyed.

The sludge may be moved from the digester into a sludge lagoon for storing. Excess liquid may be returned to the primary settler, while the excess sludge may be barged and dumped into the ocean.

The effluent from the primary settler is contacted in an aeration tank with an activated sludge and the water-insoluble inorganic oxide described in this invention wherein contact with oxygen further accelerates the biological oxidation process which has begun in the primary settler. The aerated effluent from the aeration tank is then moved to the secondary settler wherein the sludge is removed by sedimentation or centrifugation. The sludge is then returned to either or both of the aeration tank and the primary settler for reuse. The effluent from the secondary settler is moved to the chlorination unit wherein noxious microorganisms are destroyed prior to returning the water to the river. Residence time in the aeration tank may vary from 30 to 90 minutes. Residence time in the secondary settler may be typically from 30 to 150 minutes.

In the treatment of both municipal and industrial waste water, the inorganic oxide used in the method of the instant invention may be mixed with the activated sludge at a concentration of from 0.1 wt. % to 10 wt. %, preferably 0.1 wt. % to 1.0 wt. %. It is apparent that as the sludge is continuously reused increased volume of the sludge and inorganic oxide mixture is obtained. During any of the various recycling steps described above of the sludge, a portion can be separated and incinerated. This incinerated sludge will comprise an inorganic ash including the inorganic oxide described above as well as other ash-forming materials present in waste water. This material can be recycled and mixed with fresh sludge for reuse in the method of this invention.

The following are the preferred embodiments of this invention.

The experiments below compare the use of particulates which are known in the prior art and the inorganic oxides of the instant invention in the treatment of a refinery waste water stream by an activated sludge process. The refinery waste water stream that was utilized in these experiments contained 220 mg/liter TOC and had an optical clarity measured as % transmittance of 69. The sludge used was collected from a Biox unit in commercial operation. The sludge was settled for one hour in a 2-liter cylinder and the supernatant removed and replaced with the refinery waste water. 100 milliliters aliquots of this sludge waste water mixture was added to 300 milliliter baffled shake flasks containing weighed amounts of particulate. The flasks were incubated at 30°C while being shaken on a rotary shaking machine at 250 rpm for the various times indicated. After shaking, the contents were transferred to 100 milliliter graduated cylinders and measurements of the sludge settling rate, percent settling by volume, optical clarity, i.e. the total transmission at 660 millimicrons, and total organic carbon of the supernatant were made. The experiments demonstrating recycling were run by separating the supernatant at this point and mixing the settled sludge with fresh waste water and repeating the same cycle described above.

EXAMPLE 1

This experiment was run to demonstrate the effects of the various particulates at different concentrations on sludge settling and the optical clarity of the effluents.

TABLE I

EFFECT OF PARTICULATE CONCENTRATION ON % SETTLING BY VOLUME AND % T OF SUPERNATE. SHAKES INCUBATED 1 HR. AND 17 HRS. ALL MEASUREMENTS MADE AFTER 30 MIN. SETTLING.

| Particulate and Conc., Wt. % | | % Settling by Vol. 1 Hour | 17 Hours | Supernate % T, 660 nm 1 Hour | 17 Hours |
|---|---|---|---|---|---|
| None | | 24 | 24 | 53 | 30 |
| Darco H[a] | 0.1 | 23 | 24 | 42 | 23 |
| Darco C[b] | 0.1 | 23 | 23 | 46 | 24 |
| Activated Coke[c] | 0.1 | 24 | 23 | 53 | 36 |
| | 1.0 | 23 | 22 | 54 | 30 |
| | 2.0 | 23 | 23 | 53 | 32 |
| | 10.0 | 29 | 32 | 43 | 22 |
| Fluid Coke[d] | 0.1 | 24 | 28 | 50 | 31 |
| | 1.0 | 22 | 20 | 52 | 36 |
| | 2.0 | 24 | 20 | 55 | 33 |
| | 10.0 | 28 | 27 | 46 | 26 |
| Spent Catalyst | 0.1 | 22 | 21 | 53 | 36 |
| | 1.0 | 18 | 17 | 55 | 41 |
| | 2.0 | 17 | 17 | 58 | 42 |
| | 10.0 | 25 | 27 | 67 | 58 |

Footnotes:
[a,b]Powdered activated carbons: Hydrodarco H, Hydrodarco C (ICI, America).

| | Hydrodarco H | Hydrodarco C |
|---|---|---|
| Particle size, min. %-325 mesh | 70 ($\approx 45\mu$) | 70 ($\approx 45\mu$) |
| Tamped density, g/ml | 0.70 | 0.70 |
| Lbs./cu. ft. | 44 | 44 |
| Surface area, m²/g | 475 | 550 |
| pH | 10.5 | 10.5 |
| Molasses RE, dry basis | 40 | 95 |
| Water solubles, % | 3.5 | 5.5 |

[c]Activated coke: Fluid coke activated until 45–50% of the original carbon was consumed. 28 × 150 mesh, surface area of 398 m²/g, pore volume of about 0.23 cc/g (2).
[d]Fluid coke: 28 × 325 mesh.

It is clear from the results shown in Table I that only the inorganic oxide of the instant invention (spent catalyst) appears to have a significant effect on sludge settleability, showing a 25% reduction in settled sludge volume compared to the control. This inorganic oxide also increased the optical clarity of the supernatants, particularly when used at higher concentrations.

EXAMPLE 2

The particulates used in Example 1 where ground to determine whether a finer suspension of these materials would enhance sludge settleability and supernatant clarity. The results as shown in Table II indicate no advantage to be gained in sludge settleability and, indeed, a decrease in optical clarity of the supernatant is noted. It should be noted that in the above examples, the inorganic oxide utilized was the preferred spent cracking catalyst which was obtained from the fluid cracking process. This material may be characterized as a 10% x-zeolite alumina silicate, having a surface area of 94 m²/g; a pore volume of 0.44 cc/g; a bulk density of 0.72 g/cc; average particle size of 67 μ diameter, and chemically consisting of alumina, 32.5 wt. %; Na, 0.06 wt. %; Fe, 0.33 wt. %; Cu, 10 ppm; V, 780 ppm; Ni, 161 ppm. Table II(a) below shows a typical composition range for the preferred water insoluble inorganic oxide of the instant invention, i.e. the spent fluid cracking catalyst.

TABLE II

EFFECT OF POWDERING THE COKES AND THE SPENT CATALYST ON SLUDGE SETTLEABILITY AND % T OF SUPERNATE.
SHAKES INCUBATED 1 HR. AND 17 HRS. ALL MEASUREMENTS MADE AFTER 30 MIN. SETTLING

| Particulate and Conc., Wt. % | | % Settling by Vol. 1 Hour | 17 Hours | Supernate % T, 660 nm 1 Hour | 17 Hours |
|---|---|---|---|---|---|
| None | | 27 | 26 | 61 | 29 |
| Darco H | 0.1 | 27 | 27 | 46 | 20 |
| Darco C | 0.1 | 27 | 30 | 45 | 21 |
| Activated Coke | 0.1 | 26 | 26 | 44 | 18 |
| | 1.0 | 24 | 25 | 35 | 3 |
| Fluid Coke | 0.1 | 26 | 25 | 46 | 21 |
| | 1.0 | 24 | 21 | 36 | 3 |
| Catalyst | 0.1 | 25 | 22 | 45 | 18 |
| | 1.0 | 20 | 17 | 20 | 4 |

TABLE II(a)

| | |
|---|---|
| Alumina ($Al_2O_3$), wt% | 30–36 |
| Sodium oxide ($Na_2O$), wt% | 0.23–0.42 |
| Iron (Fe), wt % | 0.18–0.24 |
| Vanadium (V), ppm | 213–420 |
| Nickel (Ni), ppm | 135–246 |
| Copper (Cu), ppm | 9–14 |
| Carbon (C), wt % | 0.4 to 1.5 |
| Surface area, m²/g | 65–95 |
| Pore volume, ml/g | 0.17–0.38 |
| Apparent Bulk Density, g/ml | 0.60–0.73 |
| Particle Size: | |
| 0–20 Microns, wt % | 0–17 |
| 0–40 Microns, wt % | 5–90 |
| 0–80 Microns, wt % | 78–99 |

EXAMPLE 3

This example was undertaken to determine if sludge in combination with the particulate matter could be recycled and also the effect of the particulate matter alone on waste water purification. Three experiments were performed.

First, sludge plus waste water plus particulate were compared to waste water plus particulate by incubating for one hour and measuring sludge settling (where present), and the % T and TOC of the supernatant.

In the second experiment the incubation time was extended to 17 hours.

In the third, the supernatant from the second, after 30 min. settling, was replaced with "fresh" wastewater and reincubated for six hours (recycle).

Figure 2:
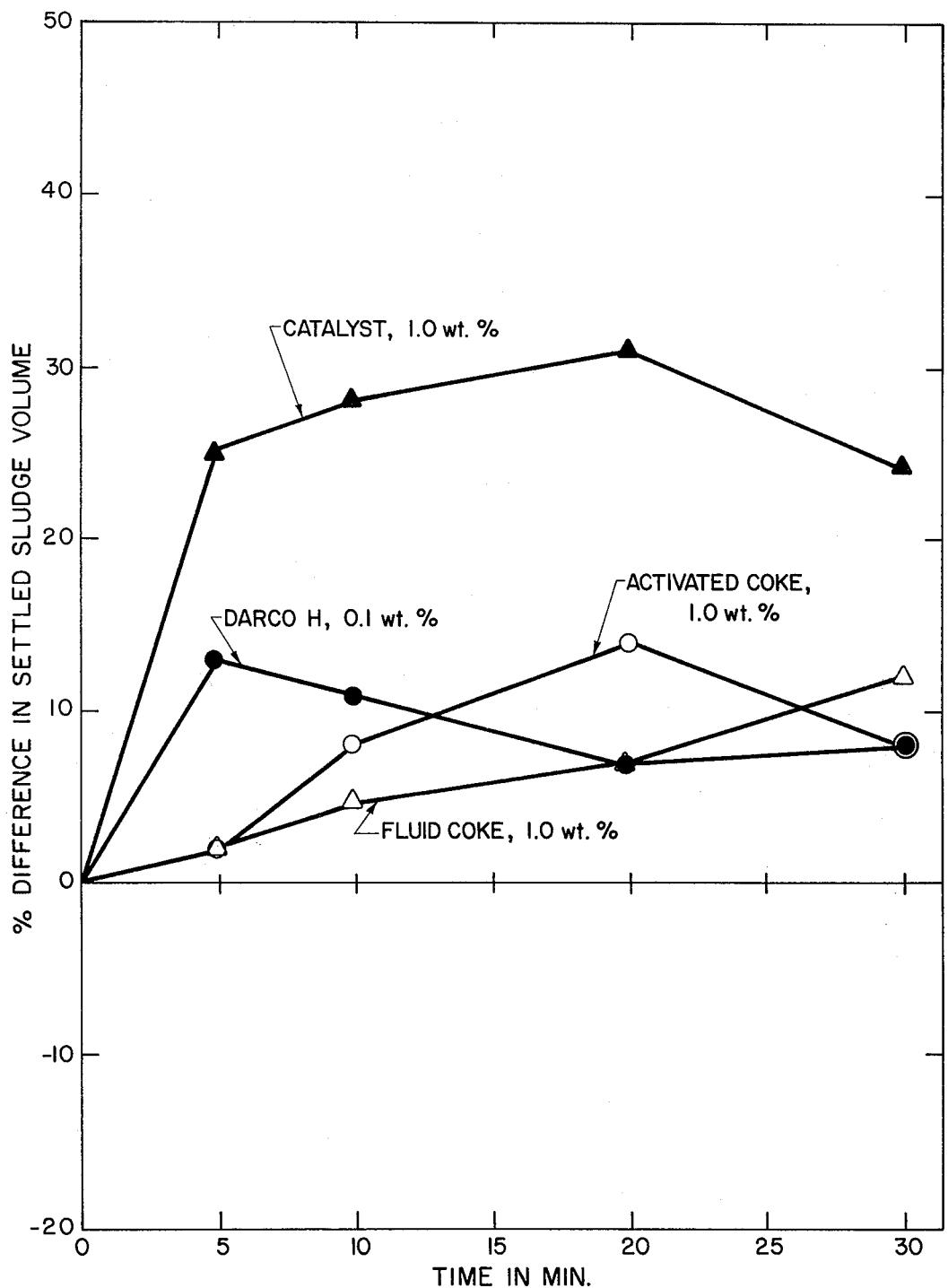
Figure 3:
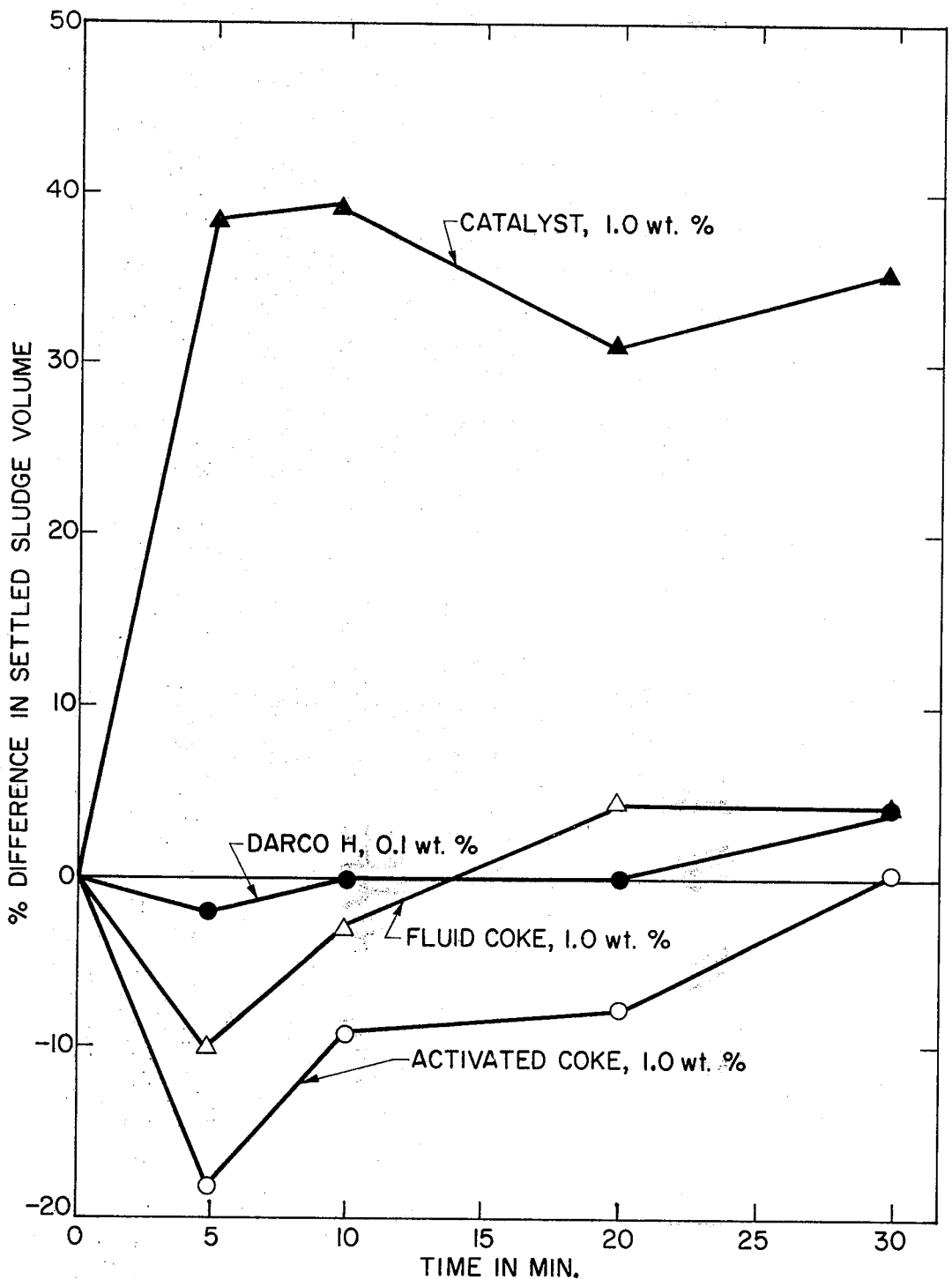
Figure 4:
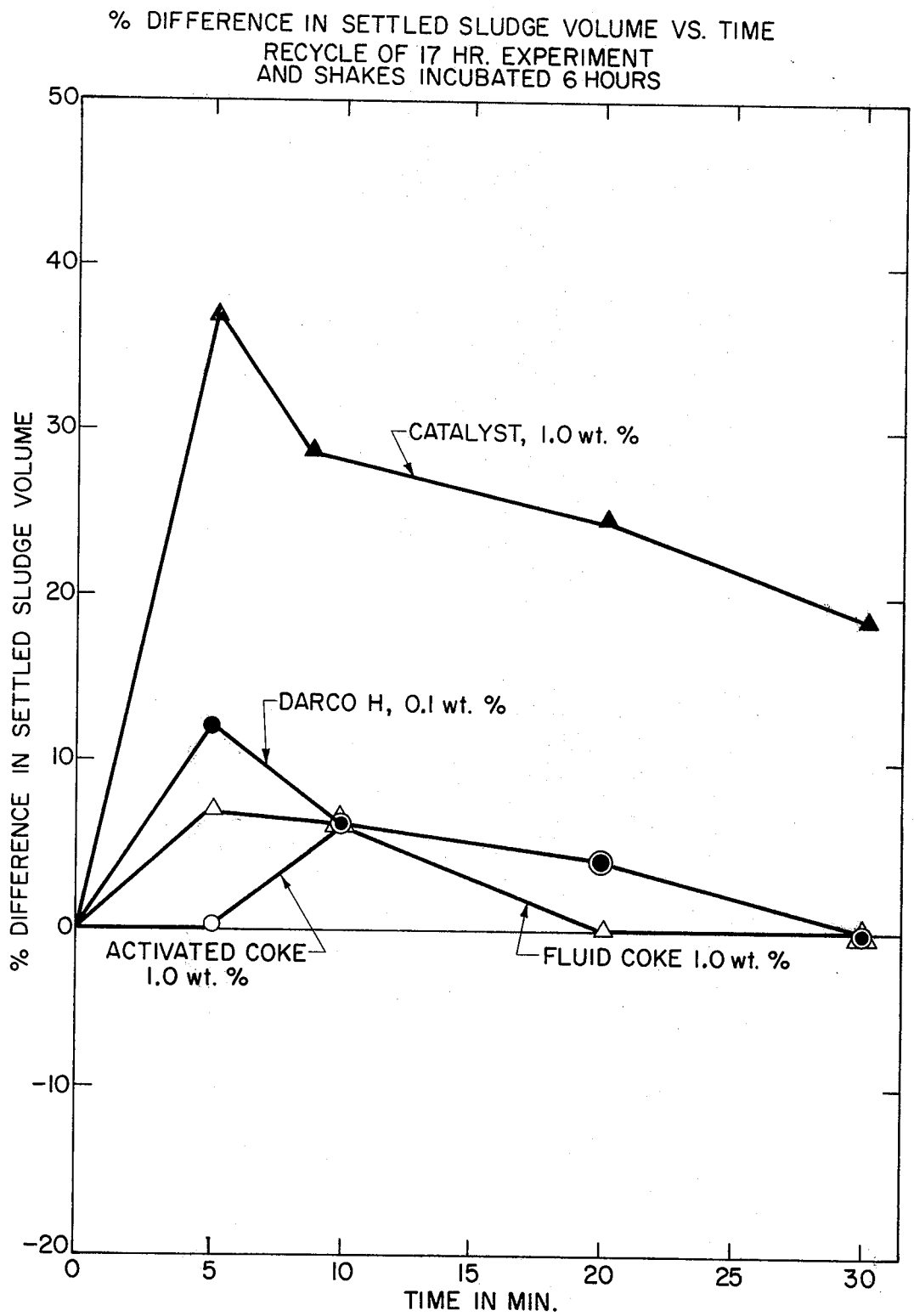

The results of the experiments are shown in FIGS. 2, 3, and 4 and Table III. The % settling by volume is reported as the % difference between the control (no support added) and the experimental, $$\frac{\% \text{ set. by vol. control} - \% \text{ set. by vol. exp.}}{\% \text{ set. by vol. control}} \times 100$$

and in the figures is plotted against time. A positive plot indicates a decrease in settled sludge volume compared to the control, a negative plot indicates an increase. The zero line represents the control.

With Sludge:

The sludge settling data (FIGS. 1, 2, 3) are consistent with the earlier experiments; only the catalyst has an apparently significant effect. The enhancement in settling is greatest at the earlier times; the catalyst achieved almost a 40% reduction in sludge volume by five minutes and maintained a 20–35% reduction at 30 minutes, indicating an increase in settling rate as well as sludge compaction. There was no apparent effect of incubation time or recycle.

This is commercially significant as it would lend itself to constructing smaller treating plants or operating at increased throughputs. Initial hindered settling observed with activated carbon and the cokes following 17 hours incubation and the loss of hindered settling following the recycle should be noted.

Comparing the TOC data on the particulates plus sludge to the control (Table III, top), again only the catalyst appears to give significant reductions. Compared to the input waste water TOC the catalyst yielded reductions of 54% and 61% in experiments two and three, respectively, compared to the control where reductions of 20% and 39% were observed, respectively. Failure to observe the significant enhancement in Experiment 1 is probably attributable to the shorter incubation time (one hour).

The direct relationship between sludge settling rate and compaction, and supernatant optical clarity, and the inverse relationship of these to the TOC is noted. The shorter incubation times are the most effective and the particulates (and sludge) can apparently be recycled.

Without Sludge:

The % transmittance observations on the waste water incubated with the particulates compared to the incubating the waste water alone indicate that shorter incubation times are preferable. The catalyst removes more material in the waste water than the other particulates, producing a supernatant of higher or equivalent optical clarity compared to the control and input waste water.

The TOC data indicate that the fluid coke and catalyst produced equivalent reductions in input TOC of 40%, 30%, and 26% for 1 hr., 17 hrs., and 6 hrs. recycle incubations, respectively, compared to incubating the waste water alone where 10%, 24%, and 16% reductions were observed. Powdered activated carbon resulted in a 40% TOC reduction when incubated for 1 hr., but on longer incubation times its effectiveness decreased, more so than that of the fluid coke and catalyst. Activated coke, as expected, produced the greatest TOC reductions: 57%, 60%, 50% for 1 hr., 17 hrs., and 6 hrs. recycle experiments, respectively, compared to input TOC.

The decrease in optical clarity and smaller TOC reductions observed on longer incubation times may be attributable to "solubilization," due to abrasion, that results in finer particles that fail to settle. This is most apparent with powdered activated carbon and least apparent with the catalyst.

The results indicate an active role for the particulates in increasing optical clarity (except powdered activated carbon) and reducing TOC of waste water. Again, shorter incubation times are preferable, and the particulates can be recycled.

Comparison of Supports in Presence and Absence of Sludge:

The % transmittance data suggest that the sludge is more readily solubilized than the particulates particularly at the longer incubation times. This is most apparent with the catalyst and least apparent with the powdered activated carbon. The solubilization of the sludge floc may be inhibited by the particulate which promotes agglomeration by acting as a nucleation center.

"abrasive solubilization" and/or is a better nucleation center than the other particulates.

A positive synergistic effect between the sludge and the powdered activated carbon, fluid coke, and catalyst is indicated by the lower TOC obtained in the presence of both sludge and particulate than by either sludge or particulate alone. Again, this is most apparent in the 1 hr. experiment and the 6 hr. recycle experiments. The effect is most pronounced in the presence of the catalyst.

In summary, the data suggest that although all the particulates tested adsorb (and perhaps oxidize) contaminants directly, provide a surface on which the microbial population can adsorb, and promote increased sludge settling and compaction by acting as nucleation centers for the bio-floc, particularly the finer particles, these effects are unexpectedly increased with the catalyst as compared to the prior art particulates.

EXAMPLE 4

Sludge Filterability Test

To determine if the decreased sludge volume obtained by adding the catalyst would enhance the dewatering characteristics of the sludge, a sludge filterability test was performed. Two hundred and fifty ml. of sludge-waste water was added (without prior settling) to 500 ml. shake flasks containing the catalyst in concentrations of 0 (control), 0.1, 0.5, 1.0, and 2.0wt. %. Following incubation for 90 minutes, the sludge was settled for 30 minutes, the supernatant removed, and 50 ml. of the sludge filtered on 5.5 cm Whatman No. 1 filter paper secured in a Seitz filter holder. The filtration rate was measured.

Although no differences in rate were found, the sludge samples containing 0.5, 1.0, and 2.0wt. % catalyst had settled volumes 15% less than the control.

TABLE III

COMPARISON OF TREATING REFINERY WASTE WATER WITH ACTIVATED SLUDGE AND SUPPORTS, AND WITH SUPPORTS ALONE RELATIVE TO SLUDGE SETTLING, SUPERNATE %T, AND SUPERNATE TOC. ALL ANALYSES MADE AFTER 30 MIN. SETTLING. SUPERNATES NOT FILTERED PRIOR TO ANALYSES. EXP. 1, 1 HR. INC.; EXP. 2, 17 HRS. INC.; EXP. 3, 6 HRS. INC., RECYCLE OF EXP. 2. INCREASES IN TOC DUE TO CARBON OR COKE ADDED, BUT NOT SETTLED, NOT KNOWN.

| Supports | | % Reduction in Set. Sludge Vol. | | | Sup. % T, 660 nm | | | Sup. TOC, Mg/L | | |
|---|---|---|---|---|---|---|---|---|---|---|
| Exp. No. | | 1 | 2 | 3 | 1 | 2 | 3 | 1 | 2 | 3 |
| Waste-H₂O + Sludge +: | | | | | | | | | | |
| None (control) | | — | — | — | 50 | 36 | 47 | 120 | 159 | 116 |
| Darco H, | 0.1 g/100 | 8 | 4 | 0 | 42 | 26 | 42 | 114 | 181 | 109 |
| Act. Coke, | 1.0 g/100 | 8 | 0 | 0 | 41 | 32 | 47 | 150 | 164 | 99 |
| Fluid Coke, | 1.0 g/100 | 12 | 4 | 0 | 54 | 41 | 49 | 114 | 144 | 100 |
| Catalyst, | 1.0 g/100 | 24 | 35 | 19 | 54 | 52 | 65 | 110 | 91 | 74 |
| Waste-H₂O +: (No sludge) | | | | | | | | | | |
| None (control) | | Cokes & catalyst | | | 68 | 65 | 62 | 198 | 150 | 160 |
| Darco H, | 0.1 g/100 | settled out | | | 53 | 34 | 46 | 130 | 155 | 147 |
| Act. Coke, | 1.0 g/100 | immediately. Darco H | | | 66 | 51 | 58 | 95 | 80 | 95 |
| Fluid Coke, | 1.0 g/100 | → gray-black sup. + | | | 67 | 54 | 55 | 135 | 141 | 145 |
| Catalyst, | 1.0 g/100 | large flocs in susp. | | | 76 | 62 | 64 | 126 | 135 | 137 |
| | | Settled vol. ≈1-2% | | | | | | | | |
| Waste-H₂O at Start of | | % T | TOC | | | | | | | |
| Exp. 1 | | 69 | 220 | | | | | | | |
| Exp. 2 | | 69 | 198 | | | | | | | |
| Exp. 3 | | 69 | 190 | | | | | | | |

As the incubation time is extended, the particulate itself is "solubilized" by abrasion leading to a decrease in optical clarity. In addition, perhaps due to growth, the bio-floc becomes more soluble, adding to the decreased optical clarity. As mentioned above, any particulate or sludge remaining in suspension (solubilized) would be lost on recycle. Such a loss would be expected to result in an increase in optical clarity at the conclusion of the recycle experiment, as observed. The results further suggest that the catalyst is more resistant to In addition, after 100 110 seconds filtration, the 1.0 and 2.0 wt. % samples left a visible filter cake whereas the other samples were still visibly wet slurries.

In addition, the catalyst concentration of 0.5 wt. % was as effective as 1.0 and 2.0 wt. % in enhancing sludge settling and compaction.

What is claimed is:

1. In a process for biologically treating industrial and municipal waste water containing organic carbon, which comprises the steps of mixing said waste water with an activated sludge at conditions whereby a portion of the organic carbon present in said waste water is biologically oxidized, said conditions including a temperature of from 10° to 60°C, and separating an effluent from said mixture of waste water and activated sludge which is depleted in organic carbon, the improvement which comprises mixing with said activated sludge a catalyst which has been deactivated in a fluid cracking process, said catalyst comprising V, Fe, Ni, Cu, and C supported on an inorganic oxide selected from the group consisting of alumina, silica, aluminum silicates and mixtures thereof said catalyst being mixed at a ratio of inorganic oxide to activated sludge of from 0.1 to 10 wt. % of said activated sludge whereby said inorganic oxide functions as a nucleation center.

2. The process of claim 1 wherein said inorganic oxide comprises a zeolite dispersed in an alumina matrix.

* * * * *